US010742050B2

(12) United States Patent
Rich et al.

(10) Patent No.: US 10,742,050 B2
(45) Date of Patent: Aug. 11, 2020

(54) ACCESSORY COMMUNICATION OVER POWER PINS

(71) Applicant: APPLE INC., Cupertino, CA (US)

(72) Inventors: Zachary C. Rich, Sunnyvale, CA (US); Daniel S. Naito, Santa Cruz, CA (US); Kirill Kalinichev, San Francisco, CA (US); Jahan C. Minoo, San Jose, CA (US); James L. McPeak, Fremont, CA (US); Jason W. Brinsfield, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 859 days.

(21) Appl. No.: 14/818,239

(22) Filed: Aug. 4, 2015

(65) Prior Publication Data
US 2016/0190840 A1 Jun. 30, 2016

Related U.S. Application Data

(60) Provisional application No. 62/033,096, filed on Aug. 4, 2014.

(51) Int. Cl.
H02J 7/00 (2006.01)
G06F 1/16 (2006.01)
(Continued)

(52) U.S. Cl.
CPC .......... H02J 7/0045 (2013.01); G06F 1/1632 (2013.01); H02J 7/0027 (2013.01);
(Continued)

(58) Field of Classification Search
CPC ...... H02J 7/0045; H02J 7/0036; H02J 7/0004; H02J 2007/0001; H02J 2007/0096; H02J 2007/0098
(Continued)

(56) References Cited

U.S. PATENT DOCUMENTS 4,092,596 A 5/1978 Dickinson
5,166,807 A 11/1992 Masuda
(Continued)

FOREIGN PATENT DOCUMENTS

TW 200937795 A 9/2009

OTHER PUBLICATIONS

PCT/US2015/043670, "Invitation to Pay Additional Fees and Partial Search Report", dated Oct. 19, 2015, 5 pages.
(Continued)

Primary Examiner — Richard Isla
Assistant Examiner — Tessema Kebede
(74) Attorney, Agent, or Firm — Kilpatrick Townsend & Stockton, LLP

(57) ABSTRACT

Simplified interfaces for charging and communication between accessories and docking stations. One example may provide an interface for charging and communication between an accessory and docking station where data and a charging voltage are provided over the same pins. An accessory may determine that it is in a powered docking station by receiving a charging voltage. The accessory may determine that it is in an unpowered docking station by providing a voltage to the unpowered docking station, where the unpowered docking station uses the voltage to power an oscillator. The oscillator signal may be received by the accessory, which may use the presence of the signal to determine that it is in an unpowered docking station.

26 Claims, 14 Drawing Sheets

(51) Int. Cl.
  *H04B 1/3883* (2015.01)
  *H04L 12/10* (2006.01)
  *H04M 1/725* (2006.01)
  *H01M 10/42* (2006.01)
(52) U.S. Cl.
  CPC ........ *H02J 7/00036* (2020.01); *H02J 7/0036* (2013.01); *H04B 1/3883* (2013.01); *H04L 12/10* (2013.01); *H01M 10/4257* (2013.01); *H02J 7/00034* (2020.01); *H02J 7/00045* (2020.01); *H04M 1/72527* (2013.01)
(58) Field of Classification Search
  USPC ........................................................ 320/106
  See application file for complete search history.

(56) References Cited

U.S. PATENT DOCUMENTS

| | | | | |
|---|---|---|---|---|
| 5,321,350 | A * | 6/1994 | Haas | G01R 23/02 324/76.11 |
| 5,724,005 | A | 3/1998 | Chen | |
| 6,141,169 | A | 10/2000 | Pietruszynski | |
| 6,151,649 | A | 11/2000 | Liong | |
| 7,170,259 | B2 * | 1/2007 | Veselic | H02J 7/00 320/106 |
| 7,271,568 | B2 * | 9/2007 | Purdy | H02J 7/0052 320/106 |
| 7,627,128 | B2 * | 12/2009 | Sander | H04M 1/05 381/74 |
| 8,261,000 | B2 * | 9/2012 | Kelley | G06F 1/1613 710/16 |
| 8,332,664 | B2 * | 12/2012 | Farrar | G06F 1/266 710/105 |
| 8,397,982 | B2 * | 3/2013 | Slaby | G06F 1/1626 235/375 |
| 8,898,348 | B2 * | 11/2014 | Minoo | G06F 1/1632 320/107 |
| 9,030,208 | B2 * | 5/2015 | Shoykhet | G06F 13/4081 324/538 |
| 2005/0174094 | A1 | 8/2005 | Purdy | |
| 2005/0249271 | A1 | 11/2005 | Lau | |
| 2007/0106828 | A1 * | 5/2007 | Kelley | G06F 1/1613 710/303 |
| 2007/0234420 | A1 * | 10/2007 | Novotney | G06F 21/31 726/16 |
| 2007/0291825 | A1 | 12/2007 | Endoh | |
| 2009/0091422 | A1 * | 4/2009 | Minoo | G06F 13/4282 340/5.8 |
| 2011/0038282 | A1 | 2/2011 | Mihota | |
| 2011/0087818 | A1 * | 4/2011 | Kelley | G06F 1/1613 710/303 |
| 2012/0026018 | A1 * | 2/2012 | Lin | G06F 13/4068 341/26 |
| 2012/0153016 | A1 * | 6/2012 | Slaby | G06F 1/1626 235/375 |
| 2013/0207938 | A1 | 8/2013 | Ryshtun | |
| 2013/0305066 | A1 * | 11/2013 | Mullins | G06F 1/266 713/310 |
| 2016/0094368 | A1 | 3/2016 | Lew | |

OTHER PUBLICATIONS

PCT/US2015/043670, International Search Report and Written Opinion dated Mar. 24, 2016, 19 pages.
Office Action (English Translation) dated Aug. 23, 2017 in Taiwan Patent Application No. 105143018, 4 pages.
First Office Action (English Translation) dated Aug. 28, 2018 in Chinese Patent Application No. 201580041959.2, 19 pages.
Office Action (English Translation) dated Jun. 24, 2019 in Chinese Patent Application No. 201580041959.2, 5 pages.
Office Action dated Jan. 9, 2020 in U.S. Appl. No. 15/721,182, 19 pages.
Korean Office Action (English Translation) dated Dec. 3, 2019 in Korean Patent Application No. 10-2017-7003124, 11 pages.

* cited by examiner

ACCESSORY COMMUNICATION OVER POWER PINS

CROSS-REFERENCE TO RELATED APPLICATIONS

This application claims the benefit of U.S. provisional patent application No. 62/033,096, filed Aug. 4, 2014, which is incorporated by reference.

BACKGROUND

Portable media devices, portable computing devices, smart phones, tablets, laptops, and other media and computing devices have become ubiquitous. The features and capabilities of these devices have similarly multiplied.

In order to take full advantage of these features and capabilities, the universe of accessories that may communicate or operate in conjunction with these media players and computing devices has similarly expanded. Headphones, earbuds, jewelry, pedometers, watches, headsets, and other wearable devices, external speakers, FM transmitters, remote controls, keyboards, mice, game controllers, and other input devices, and other accessories fill electronics stores.

These accessories are often small sized and battery powered. Accordingly, they need to be charged to be useful, and each charge may last for only a limited amount of use. These accessories may be recharged using docking stations. Such docking stations may receive power from a power source and use that power to charge the accessory.

Such power transfers may require connections between docking stations and accessories that include connector inserts and receptacles. These inserts and receptacle may each have several pins. These complicated connectors may be large in size. These large connectors may limit how small an accessory may be made. Also, these complicated and bulky connectors may degrade an accessory's appearance.

Thus, what is needed are circuits, methods, and apparatus that provide charging to an accessory from a docking station using a simplified interface.

SUMMARY

Accordingly, embodiments of the present invention may provide simplified interfaces for charging accessories using docking stations. Further embodiments of the present invention may further provide for communication between an accessory and a docking station, or between two or more accessories in a docking station, either directly or by using the docking station as an intermediary. An illustrative embodiment of the present invention may provide an interface for charging and communication between an accessory and docking station where data and a charging voltage are provided over the same pins. In a specific embodiment of the present invention, a docking station may provide a charging voltage on a first pin and a reference ground on a second pin. Data may be transferred by modulating the charging voltage on the first pin. The docking station may modulate the charging voltage to send data to the accessory and the accessory may modulate the charging voltage itself to send data to the docking station. The modulation may be done by adding or omitting an intermediate frequency (IF) signal or radio frequency (RF) to the charging voltage. For simplicity, IF and RF signals may both be referred to herein as IF signals. The frequency of the IF signal may be 40, 46, 48, or 52 MHz, or other frequency. The frequency may be varied, for example in a spread-spectrum fashion. The IF signal may be modulated using a form of Amplitude-Shift Keying (ASK), such as ON-OFF Keying, or other modulation technique. Specifically, the IF signal can be gated such that the presence of the IF signal indicates a bit having a first polarity (for example, a "0" or a "1") and the absence of the IF signal indicates a bit having a second polarity (for example, a "1" or a "0.") The on time and off time may be the same or they may be different. The communication between the docking station and the accessory may be unidirectional, half-duplex bidirectional, or full-duplex bidirectional. For example, the accessory and docking station may use different IF frequencies to enable full-duplex bidirectional communication. In other embodiments of the present invention, other types of modulation may be possible. For example, the charging voltage may be gated on and off to indicate bits having different polarities.

In various embodiments of the present invention, an accessory may be able to determine that it is has been placed in a docking station. These docking stations may be battery powered, powered by an external power source, or both. When an accessory is placed in a docking station that is powered by either a charged battery or external power source, the accessory may detect that a charging voltage is received on a first pin. The accessory may then determine that it is in a docking station based on the voltage at the first pin. When the accessory is placed in a docking station that has a discharged battery and is not powered by an external source, the accessory may provide a voltage on the first pin. The docking station may receive this voltage and the received voltage may power an oscillator on the docking station, which may generate an oscillating signal. The resulting oscillation signal may be received at the first pin by the accessory. The accessory may then determine that it has been placed in an unpowered docking station. To save its own power, the accessory may provide this voltage on a periodic basis.

When an accessory has determined that it has been placed in a docking station, whether powered or unpowered, it may enter a different state, which may be referred to as a docked state. The docked state may be a reduced power state. For example, one or more transmitters, screens, drives, or other components or circuits on the accessory may be powered down or otherwise disabled.

When the accessory is in a docking station powered either by an internal battery or external power source, the accessory may negotiate for a continuation of the charging power with the docking station. That is, once the accessory has determined that it is in a docking station, and the docking station has determined the presence of the accessory, the availability of further charging power may need to be negotiated. The accessory may provide identification, authorization, or other validating information to the docking station to maintain the availability of the charging power from the docking station. In the absence of such validating information, the docking station may cease further charging, or may provide only a limited charging.

These and other embodiments of the present invention may provide a docking station that may determine the presence of an accessory. That is, a docking station may determine that an accessory has been inserted or mated with it. For example, where a docking station is powered by a charged battery of external power source, the docking station may determine that an accessory has been placed in the docking station. When the docking station makes such a determination, it may provide a charging voltage to the accessory. After some time, the docking station may negotiate for a continuation of the charging power with the accessory. The docking station may provide identification, authorization, or other validating information to the accessory, or the accessory may provide validating information to the docking station to maintain the availability of the charging power from the docking station. In the absence of such validating information, the docking station may cease further charging, or may provide only a limited charging.

In a specific embodiment of the present invention, a docking station powered by a charged battery or external power source may determine that an accessory has been inserted by providing a current to a pin of the docking station. If an accessory is attached, the capacitance at the pin may be high enough that the current takes longer than a threshold duration to charge the capacitance at the first pin to a first voltage. From this, the docking station may determine that the accessory is present. Conversely, when no accessory is attached, the capacitance at the pin may be low enough that the current charges the capacitance at the first pin to the first voltage in less than the threshold duration. From this, the docking station may determine that the accessory is absent.

When an accessory is inserted in an unpowered docking station, the docking station may receive a voltage from the accessory. The docking station may then use the received voltage to power an oscillator. A resulting oscillation signal may be provided at the first pin of the docking station and received at the first pin of the accessory. The accessory may then use the presence of the oscillation signal to determine that it has been placed in an unpowered docking station.

Embodiments of the present invention may provide reset circuitry that can reset circuitry in either or both the accessory or docking station. In a specific embodiment of the present invention, a carrier signal generated by the oscillator may be transferred for longer than a threshold duration. This event may be detected and used to reset circuitry in either or both the accessory or docking station. In another embodiment, a pulse having a duration longer than a threshold duration may be provided. This pulse may be detected by a charge pump or other circuit. The presence of this event may be detected and used to reset circuitry in either or both the accessory or docking station. Since transmit data appears on only one pin, every receiver receives data from every transmitter. In this way, a transmitting device may transmit a reset signal that may be used to reset both itself and one or more remote devices.

Again, embodiments of the present invention may transmit data by modulating a charging voltage with an IF signal. Various parameters of the IF signal, such as the amplitude or frequency of the IF signal, may be varied. Other parameters, such as data rate, transmitter output impedance, or other parameter, may be varied. Data may be transmitted as these parameters are varied and the bit-error rate of the received signal determined. Optimal parameters may then be chosen to provide data transmission with a low bit-error rate.

Embodiments of the present invention may provide an accessory where pins or contacts for the accessory are part of an enclosure for the accessory. The shape and materials for the pins on the enclosure may be chosen to provide resulting inductances and capacitances that may help tune filters at the accessory pins for improved data transmission.

Embodiments of the present invention may provide for the transmission of various types of data between docking stations and accessories, and between different accessories in a docking station, using the two pin ASK method described herein. For example, authorization, identification, and other information may be exchanged. Firmware and software updates may be provided. For example, a first accessory having a later firmware or software version may update a second accessory when the first accessory and the second accessory are in the docking station. This information may be provided from one accessory to another directly, or from one accessory to the docking station, and then from the docking station to another accessory. In one embodiment of the present invention, a first accessory may receive a software or firmware update from a computer or host device. The host device may be a computer, tablet, phone, or other device. The update information may be software or firmware, or both, and it may be for the docking station or an accessory, or both. When the first accessory is in the docking station, the first accessory may provide the update the docking station. The docking station may then use the update information, as applicable. The docking station may then pass any accessory update information to a second accessory in the docking station. Other information, such as Bluetooth pairing information, may be exchanged between accessories in a docking station, again, either directly or through the docking station. In other embodiments of the present invention, the docking station may provide the pairing information to the accessories in the docking station.

In various embodiments of the present invention, each of the accessories and the docking station may include authentication and identification information. The accessories may authenticate and trade identification information with the docking station using the data communications described above. An accessory may authenticate with a host device using Bluetooth or other channel before receiving updates from the host.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
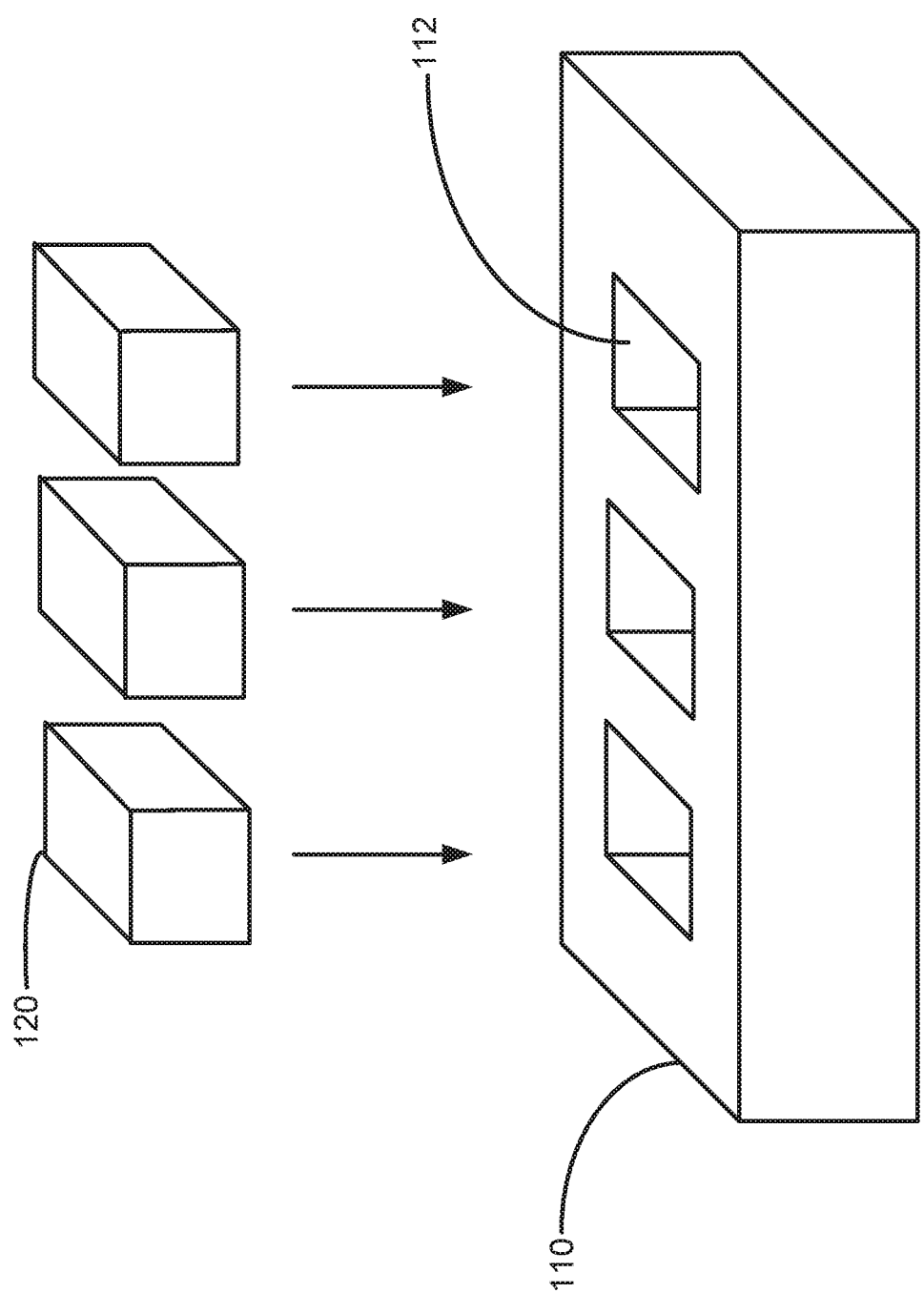
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

In this example, three accessories 120 may be placed in openings or recesses 112 in docking station 110. Accessories 120 may communicate with docking station 110 when mated with docking station 110. In these and other embodiments of the present invention, accessories 120 may communicate with docking station 110 when accessories 120 are not docked in docking station 110. Also, in various embodiments of the present invention, accessories 120 may communicate with each other through docking station 110 when docked. In these and other embodiments, accessories 120 may communicate with each other when they are not docked in docking station 110. These communications may be wired or wireless. For example, they may be Bluetooth or other wireless communications. Docking station 110 may also provide charging power to one or more of the accessories 120. This charging may be wired or wireless. For example, inductive or capacitive charging may be used.

In this example, charging and communication between accessories 120 and docking station 110 may be one where data and a charging voltage are provided over the same pins. In a specific embodiment of the present invention, docking station 110 may provide a charging voltage on a first pin and a reference ground on a second pin of an interface between docking station 110 and an accessory 120. Data may be transferred by modulating the charging voltage on the first pin. Docking station 110 may modulate the charging voltage to send data to accessory 120 and accessory 120 may modulate the charging voltage itself to send data to docking station 110. More specifically, the modulation may be done by adding or omitting an intermediate frequency (IF) signal or radio frequency (RF) to the charging voltage. Again, IF and RF signals may both be referred to herein as IF signals. The frequency of the IF signal may be 40, 46, 48, or 52 MHz, or other frequency. This frequency may be varied, for example using spread-spectrum techniques. The IF signal may be modulated using a form of ASK, such as ON-OFF Keying, or other modulation technique. Specifically, the IF signal can be gated such that the presence of the IF signal indicates a bit having a first polarity (for example, a "0" or a "1") and the absence of the IF signal indicates a bit having a second polarity (for example, a "1" or a "0.") The on and off bit times may be the same or different. The communication between the docking station and the accessory may be unidirectional, half-duplex bidirectional, or full-duplex bidirectional. For example, the accessory and docking station may use different IF frequencies to enable full-duplex bidirectional communication. In other embodiments of the present invention, other types of modulation may be possible. For example, the charging voltage may be gated on and off to indicate bits having different polarities.

In this example, three accessories 120 are shown, though in other embodiments, docking station 110 may support one, two, or more than three accessories 120. Accessories 120 may be speakers, Bluetooth headphones, headsets, or earbuds, wearable computing or media devices such as jewelry or watches, or other types of accessories. Docking station 110 may include one or more optional recesses or other surfaces or structures 112 for supporting accessories 120 during charging and data transfers. Charging and data transfers may occur over electrical connections formed between contacts on accessories 120 and contacts in or on recesses 112.

In this example, docking station 110 is shown as having three recesses 112 for supporting accessories 120. In other embodiments of the present invention, docking station 110 may have one, two, or more than three recesses or other appropriate structures or surfaces 112. Docking station 110 may have a relatively flat surface, it may be a case or other container having a lid, or it may have another appropriate form factor.

Docking station 110 may be powered by an internal battery, external power source, or other appropriate source or combination thereof. Docking station 110 may provide power to one or more accessories 120. Accessories 120 and docking station 110 may communicate with each other. Also, accessories 120 may communicate with each other via docking station 110. These communications may include authentication and identification information, firmware and software updates, user provided preferences, or other information.

When accessory 120 is inserted in slots 112 or otherwise mated with docking station 110, the accessory may be able to determine that it is mated or in a docking station. When accessory 120 is mated with docking station 110, this determination may allow accessory 120 to be put in a low power state. This low-power state may include disabling or turning off various transmitters on accessory 120. For example, the accessories may enter the so called "airplane mode." But it may be difficult for an accessory 120 to determine that is mated with docking station 110, particularly when docking station 110 is unpowered. An example of how this may be done is shown in the following figure.

Figure 2:
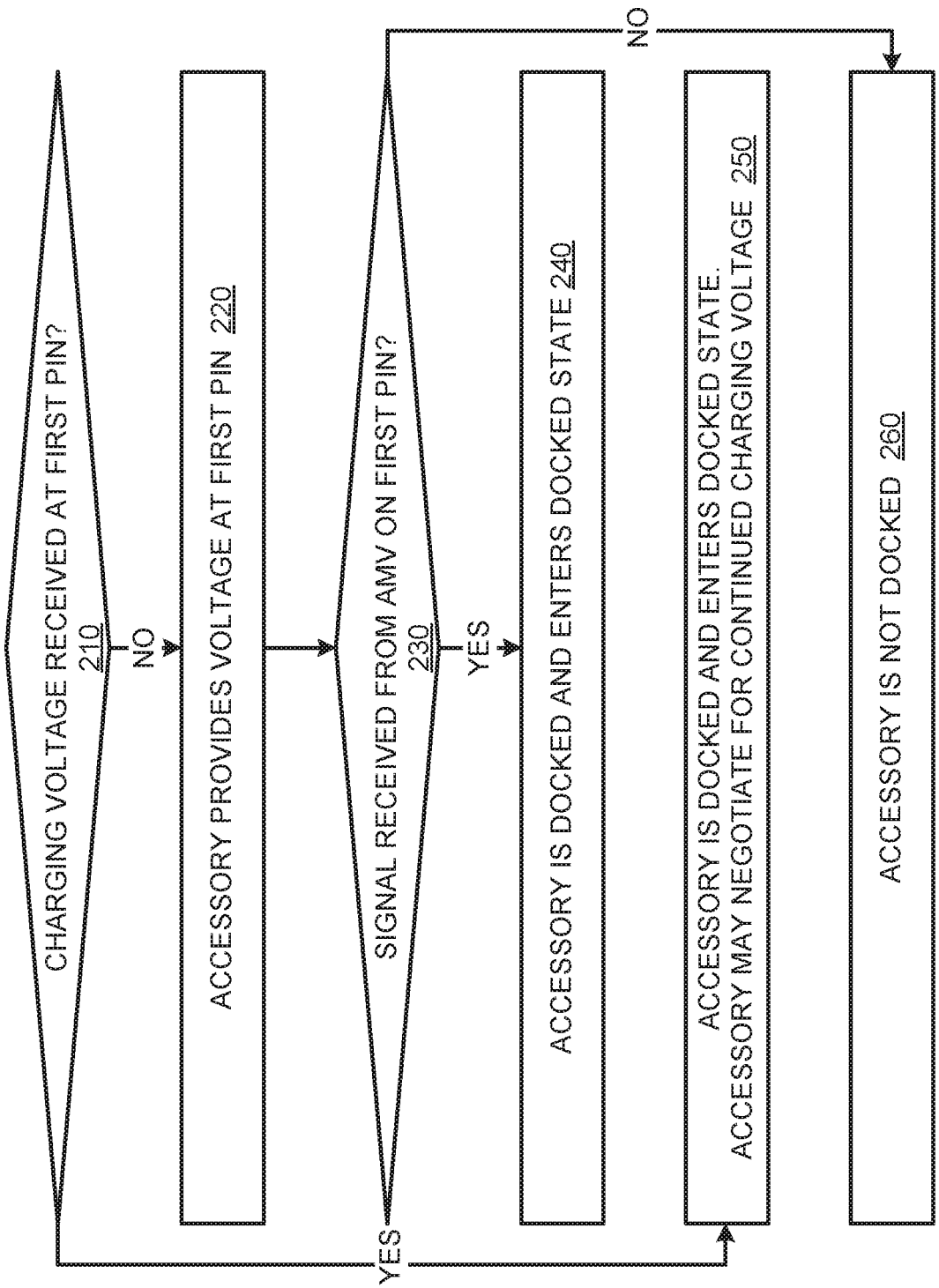
FIG. 2 illustrates a method where an accessory may determine that it is mated with a docking station according to an embodiment of the present invention.

FIG. 2 illustrates a method where an accessory may determine that it is mated with a docking station according to an embodiment of the present invention. In act 210, an accessory may determine whether a charging voltage is received at a first pin. If such a charging voltage is received, the accessory may determine that it is mated with a docking station that is powered either by a charged battery or an external power supply. In this case, the accessory may determine that it is docked in a docking station in act 250. Again, in this docked state, the accessory may enter a low power mode. For example, various Bluetooth or other wireless transceivers or transmitters on the accessory may be disabled. Also at that time, the accessory may negotiate with the docking station for a continued charging voltage. That is, once the docking station has determined that an accessory is present, it may stop providing a charging voltage after a certain time unless the accessory provides required validating information. For example, the accessory may provide authentication or identification information to the docking station. If this information is not received by docking station 110, docking station 110 may remove the charging voltage from the first pin.

If a charging voltage is not received at the first pin of the accessory in act 210, the accessory can determine that it is either undocked, or docked in a docking station that is not powered. In this case, the accessory may provide a voltage at its first pin in act 220. When the accessory is in a docking station, a voltage provided at its first pin in act 220 may power an oscillator in the docking station. The oscillator, which may be an astable multivibrator or other type of oscillator, may then provide a signal on the first pin of the docking stations that may be detected by the accessory in act 230. If this oscillator signal is received, the accessory may determine that it is docked and enter the docked state in act 240. Again, this docked state may be a low power state where some of all of the functions of the accessory are powered down. Since in this situation the docking station is unpowered, the accessory does not negotiate for the charging voltage with the docking station. If the accessory does not receive the charging voltage at its first pin and a provided voltage at its first pin does not cause an oscillating signal to be received at its first pin, it may be determined that the accessory is not docked in act 260. When an accessory is not docked, it may only periodically provide a voltage at the first pin to save power in act 220.

In a similar way, a docking station may communication with an accessory. An example is shown in the following figure.

Figure 3:
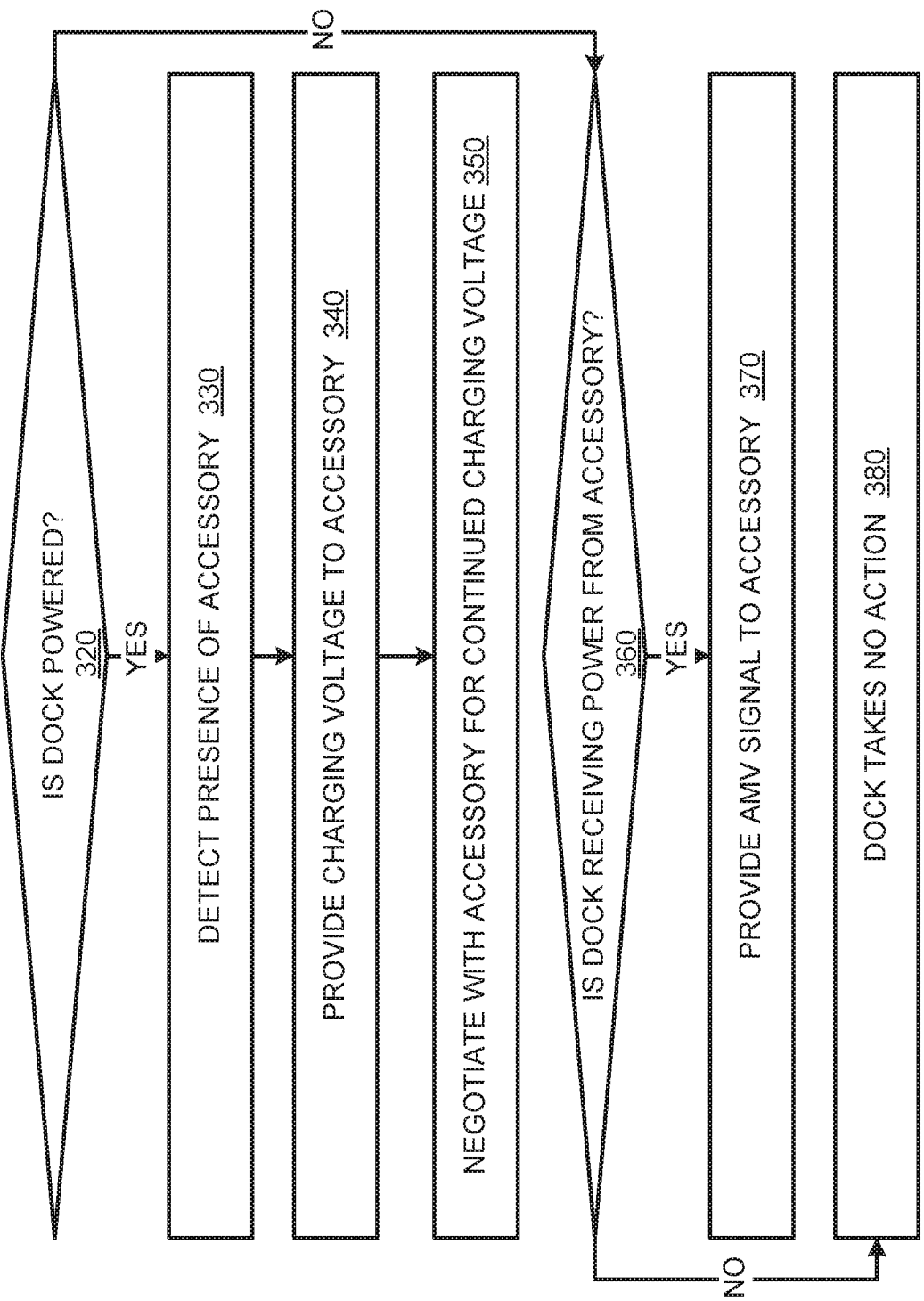
FIG. 3 illustrates a method where a docking station may establish a connection with an accessory according to an embodiment of the present invention.

FIG. 3 illustrates a method where a docking station may establish a connection with an accessory according to an embodiment of the present invention. In act 320, it is determined if the docking station is powered, for example by an internal battery or external power supply. If the docking station is powered, it may detect the presence of an accessory in act 330. If an accessory is present in act 330, a charging voltage may be provided to the accessory in act 340. Negotiations with the accessory for a continued charging voltage may be done in act 350. If the docking station is unpowered, the docking station may receive power from the accessory. If it does receive power from the accessory, the docking station may provide an oscillating signal to the accessory in act 370. Again, this oscillating signal may be used by the accessory to determine that it is docked in an unpowered docking station. If the docking station is unpowered and is not receiving power from accessory, the docking station takes no action in act 380.

The specific method of determining the presence of an accessory may vary in different embodiments of the present invention. One specific example is shown in the following figure.

Figure 4:
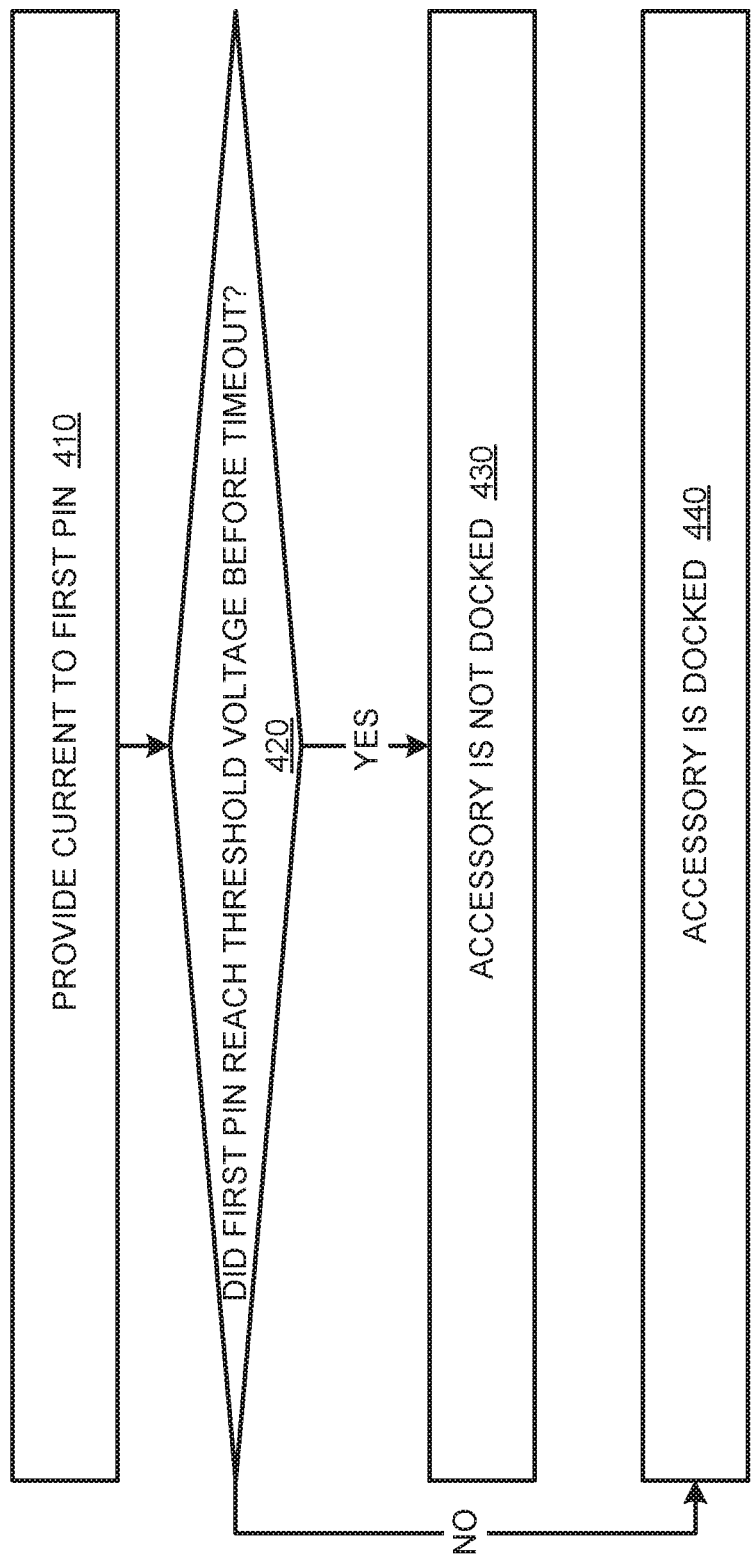
FIG. 4 illustrates a method where a docking station may determine the presence of an accessory according to an embodiment of the present invention.

FIG. 4 illustrates a method where a docking station may determine the presence of an accessory according to an embodiment of the present invention. In act 410, a current may be provided to a first pin. In act 420, it may be determined if a voltage reached a threshold voltage before a timeout occurred. If an accessory is not present, the capacitance at the first pin may have a lower value and the first pin may reach the threshold voltage before the timeout. In this case, it may be determined that an accessory is not docked in act 430. If accessory is docked, the capacitance may be much higher and the first pin may not reach the threshold voltage before the timeout. In such a case, it may be determined that an accessory is docked in act 440. An illustrative circuit that may be used to implement this function is shown in the following figure.

Figure 5:
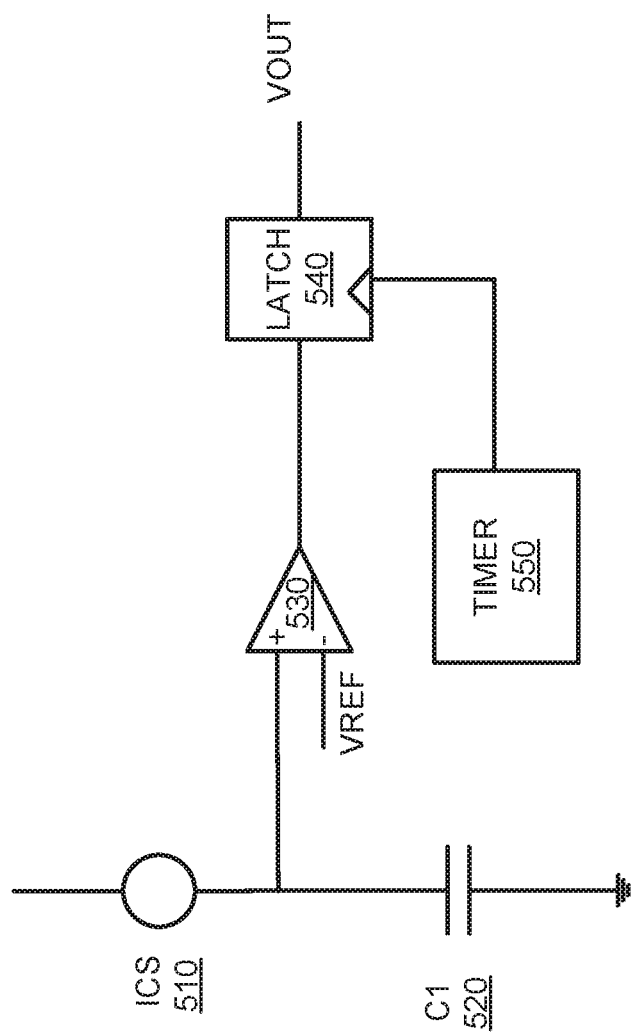
FIG. 5 illustrates a circuit that may be used in determining whether an accessory is docked with a docking station according to an embodiment of the present invention.

FIG. 5 illustrates a circuit that may be used in determining whether an accessory is docked with a docking station according to an embodiment of the present invention. In this example, a current source ICS 510 may charge capacitor C1 520. The resulting voltage may be compared to a reference voltage by comparator 530. Timer 550 may be used to indicate whether a timeout has occurred. Timer 550 may clock latch 540, which may be used to store the output of comparator 530. When an accessory is not present, C1 may be small. In this case the voltage on C1 may increase quickly, that is C1 may charge quickly. This voltage may trip the output of the comparator 530 high before timer 550 clocks latch 540. The high voltage on line VOUT may indicate that no accessory is present. When an accessory is present, C1 may be larger. The voltage across C1 may rise more slowly, and the output of the comparator 530 may not go high before timer 550 clocks latch 540. A low voltage on line VOUT may mean that an accessory is present.

In various embodiments of the present invention, the functionality described above may be implemented using interface circuits in accessories and docking stations. An example of such circuitry is shown in the following figure.

Figure 6:
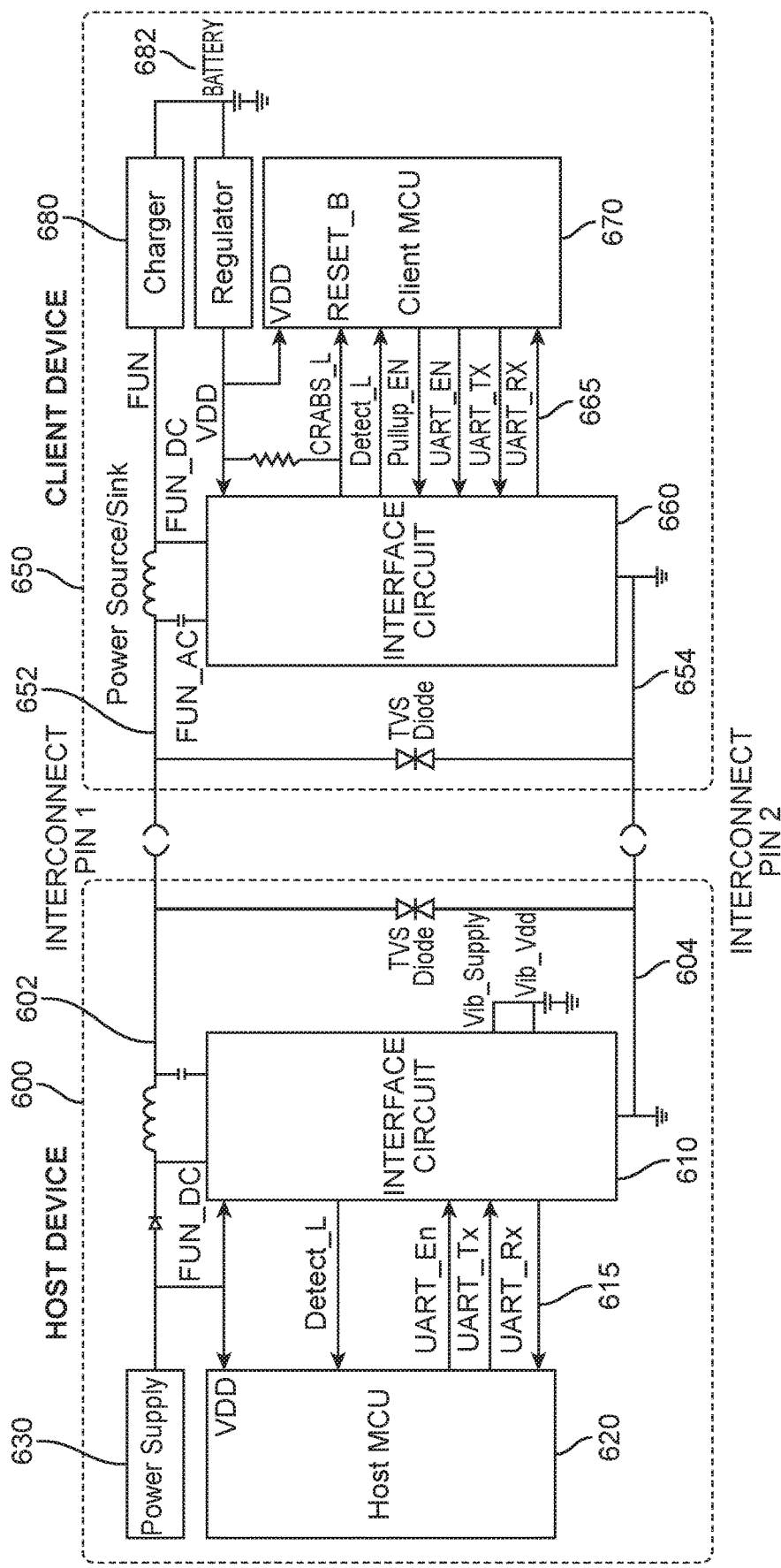
FIG. 6 illustrates interface circuitry for accessories and docking stations according to an embodiment of the present invention.

FIG. 6 illustrates interface circuitry for accessories and docking stations according to an embodiment of the present invention. This example includes circuitry 600 that may be located in a host or docking station, and circuitry 650, which may be located in an accessory. Interface circuitry 600 may include power supply 630, which may provide power through mated contacts 602 and 652 and through charger 680 to battery 682 in interface circuitry 650. Power supply 630 may receive power from an internal battery, external power source, or other source. Battery 682 in interface circuitry 650 may provide a voltage to circuitry 600 when circuitry 600 is unpowered.

Data communications may be provided through a host side microcontroller 620. Host microcontroller 620 may interface with interface circuit 610 over UART bus 615. Interface circuit 610 may transmit this data by modulating the power supply voltage provided on pin 602. This modulated voltage may be received at pin 652 and demodulated by interface circuit 660. Interface circuit 660 may communicate over UART bus 665 with a client or accessory microcontroller 670. Communication may also flow in the reverse path. Communication between these interfaces may be unidirectional, bidirectional half duplex, or bidirectional full-duplex.

Figure 7:
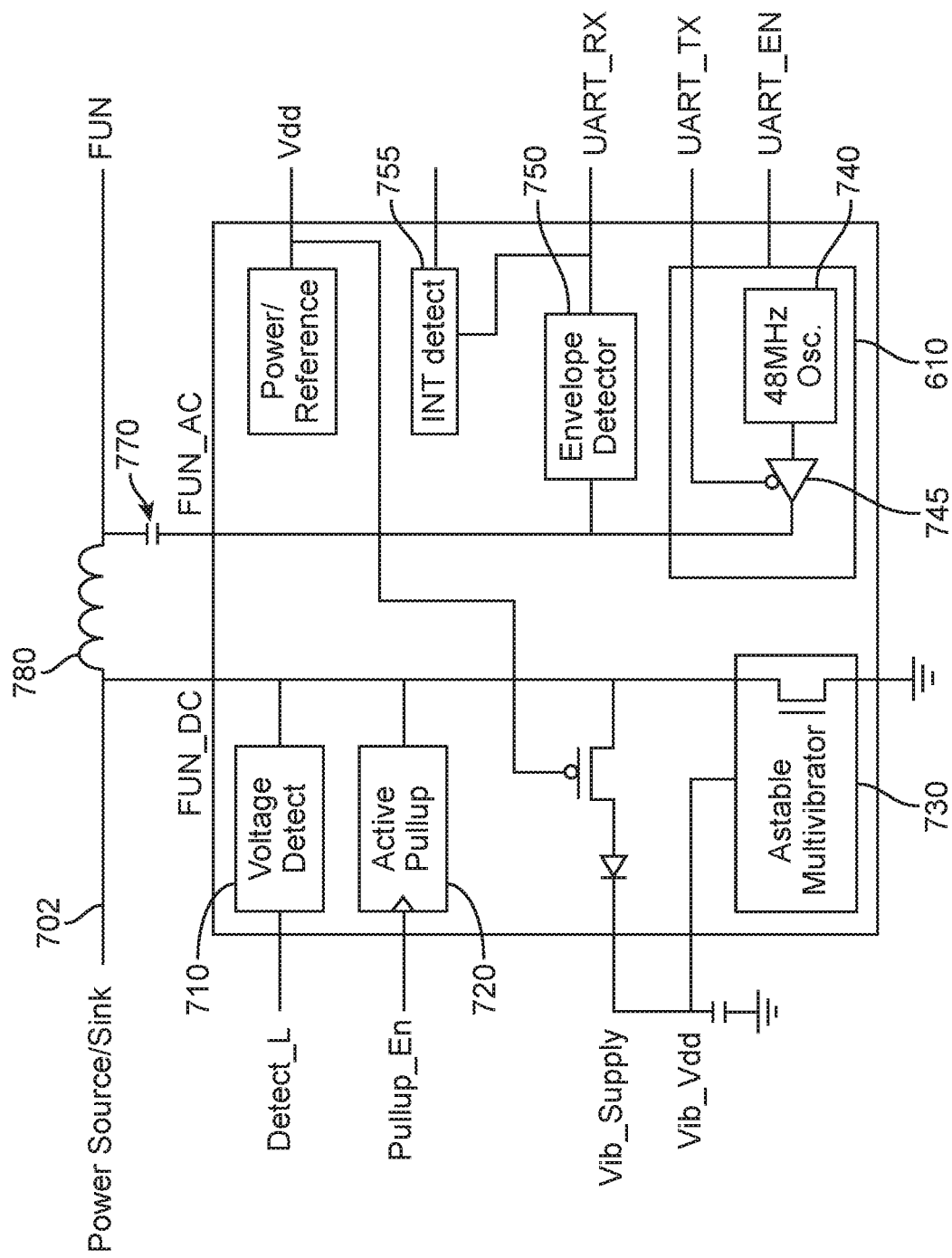
FIG. 7 is a block diagram of an interface circuit that may be used as the interface circuit in embodiments of the present invention.

FIG. 7 is a block diagram of an interface circuits that may be used as the interface circuit 610 or 660, or other interface circuits in other embodiments of the present invention. Interface circuits 610 may include a voltage detect circuit 710. The voltage detect circuit 710 may detect a level of a voltage on pin 702, which may correspond to pin 652 (or 602) in FIG. 6. This determination may be used by an accessory to determine whether a charging voltage is being provided by a docking station. This voltage detect circuitry may be absent in the host or docking station interface circuitry 610.

An active pull-up circuit 720 may be provided. This active pull-up may be formed as a constant current source to provide a load for one or more open-drain circuits, such as the astable multivibrator 730. The astable multivibrator 730 may be included in the docking station or host side to provide an oscillation signal on pin 702, which may correspond to pin 602 in FIG. 6, when the docking station is unpowered and is receiving a voltage from an accessory. The astable multivibrator 730 may be absent from the accessory or slave side interface circuitry 660.

Data may be transmitted using oscillator 740, which may drive amplifier 745. This oscillation signal may be AC coupled through capacitor 770 to inductor 780. Similarly, data may be received by envelope detector 750. An interrupt detect circuit 755 may be coupled to an output of envelope detector 750 to determine whether an interrupt event has occurred. When an interrupt event does occur, circuitry in the docking station and one or more accessories may be reset.

Again, the astable multivibrator or oscillator 730 may be used in the docking station or host side, while the voltage detect circuit 710 may be used on the accessory side. Otherwise, the various circuits in the interface circuits 610 and 660 may be used by both sides. Accordingly, to simplify production, the same interface circuits may be used for interface circuits 610 and 660 in FIG. 6. In other embodiments of the present invention, these circuits may be simplified by only including the voltage detect 710 or astable multivibrator 730 where they are needed, that is, on the accessory and host side respectively. The frequency of the astable multivibrator 730 may be 40, 46, 48, or 52 MHz, or other frequency. The frequency may also be varied, for example by employing spread-spectrum methods.

Figure 8:
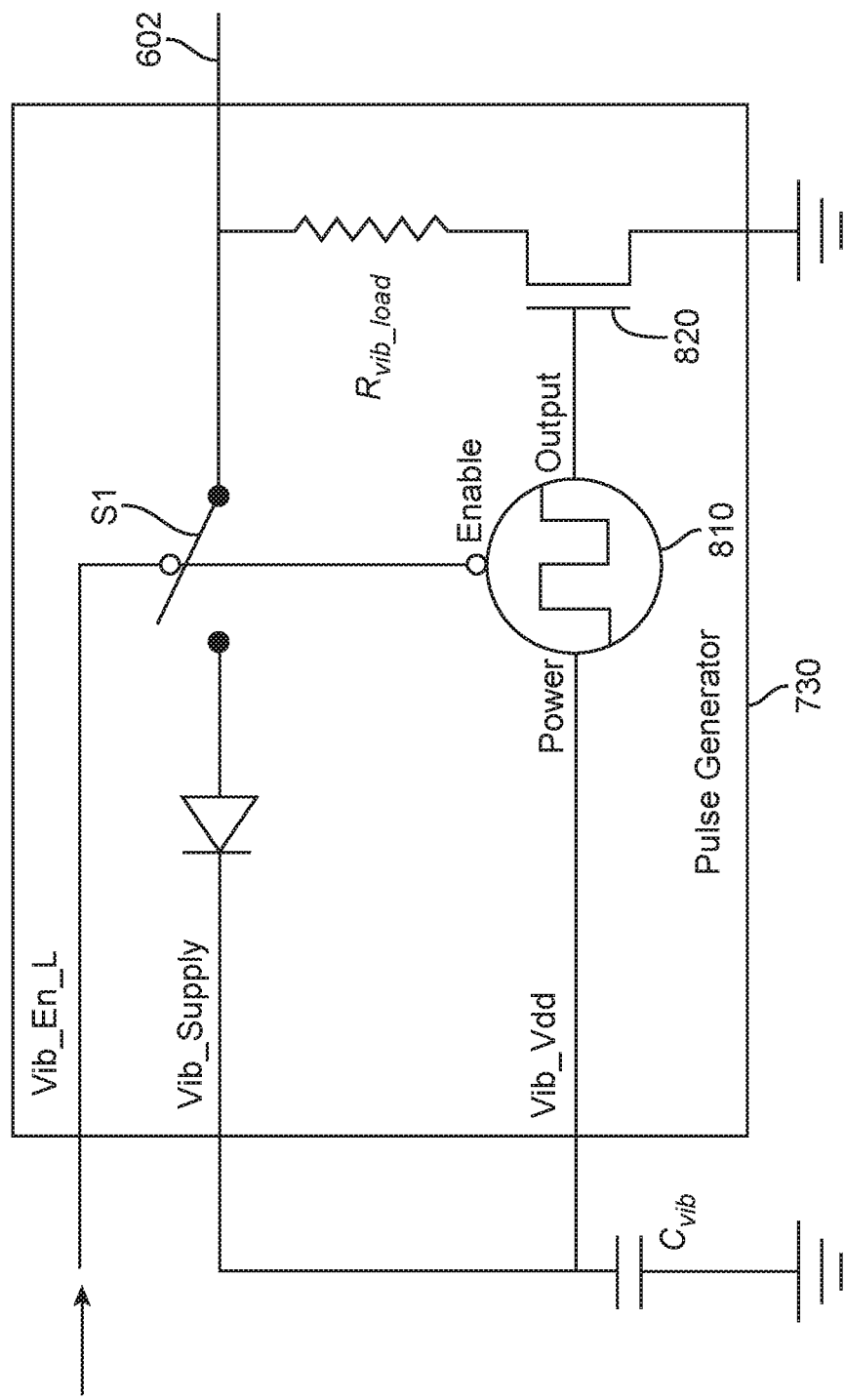
FIG. 8 illustrates an example of an astable multivibrator according to an embodiment of the present invention.

FIG. 8 illustrates an example of an astable multivibrator or oscillator according to an embodiment of the present invention. When power is provided from the accessory on line 602, switch 51 may close, thereby powering oscillator 810. Oscillator 810 may drive the gate of transistor 820. The drain of transistor 820 may provide a signal on line 602. This signal may be received by the accessory. The accessory may use this received signal to determine that it is mated with an unpowered docking station. This oscillator 810 may also be used to provide the IF modulation signal used in communicating data between a docking station and an accessory.

Again, an accessory may include a voltage detect circuit 710. This may be used by the accessory to determine whether it is receiving a charging voltage from a docking station. However, docking stations and accessories may be jostled, poor electrical connections may be formed, or other events may conspire to cause glitches in the voltage that being detected. Accordingly, voltage detect circuits consistent with embodiments of the present invention may ignore or filter some of these glitches. An example is shown in the following figure.

Figure 9:
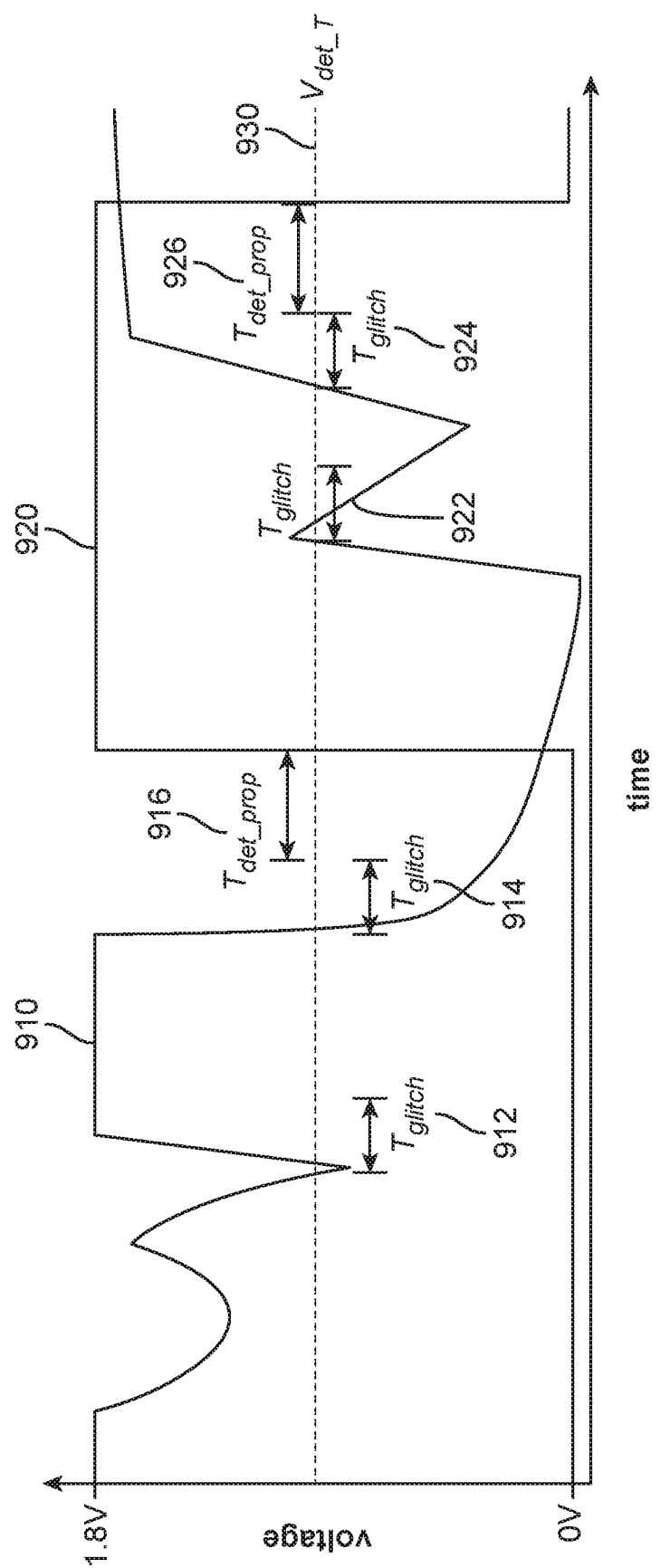
FIG. 9 illustrates the operation of a voltage detect circuit according to an embodiment of the present invention.

FIG. 9 illustrates the operation of a voltage detect circuit according to an embodiment of the present invention. An input voltage 910 may be received. This voltage waveform may include a first glitch 912, where the input voltage 910 falls below the threshold voltage 930. This first glitch may be of short duration such that it is ignored and the output of voltage detect circuit 920 does not change. A second glitch 914 may be of sufficient length that the output 920 of the voltage detect circuit 710 may change state after a signal propagation delay 916. Similarly, glitches may occur when the input voltage is increasing. This increasing voltage waveform may include a first glitch 922, where the input voltage 910 rises above the threshold voltage 930. This third glitch may be of short duration such that it is ignored and the output of voltage detect circuit 920 does not change. A fourth glitch 924 may be of sufficient length that the output 920 of the voltage detect circuit 710 may change state after a signal propagation delay 926.

Figure 10:
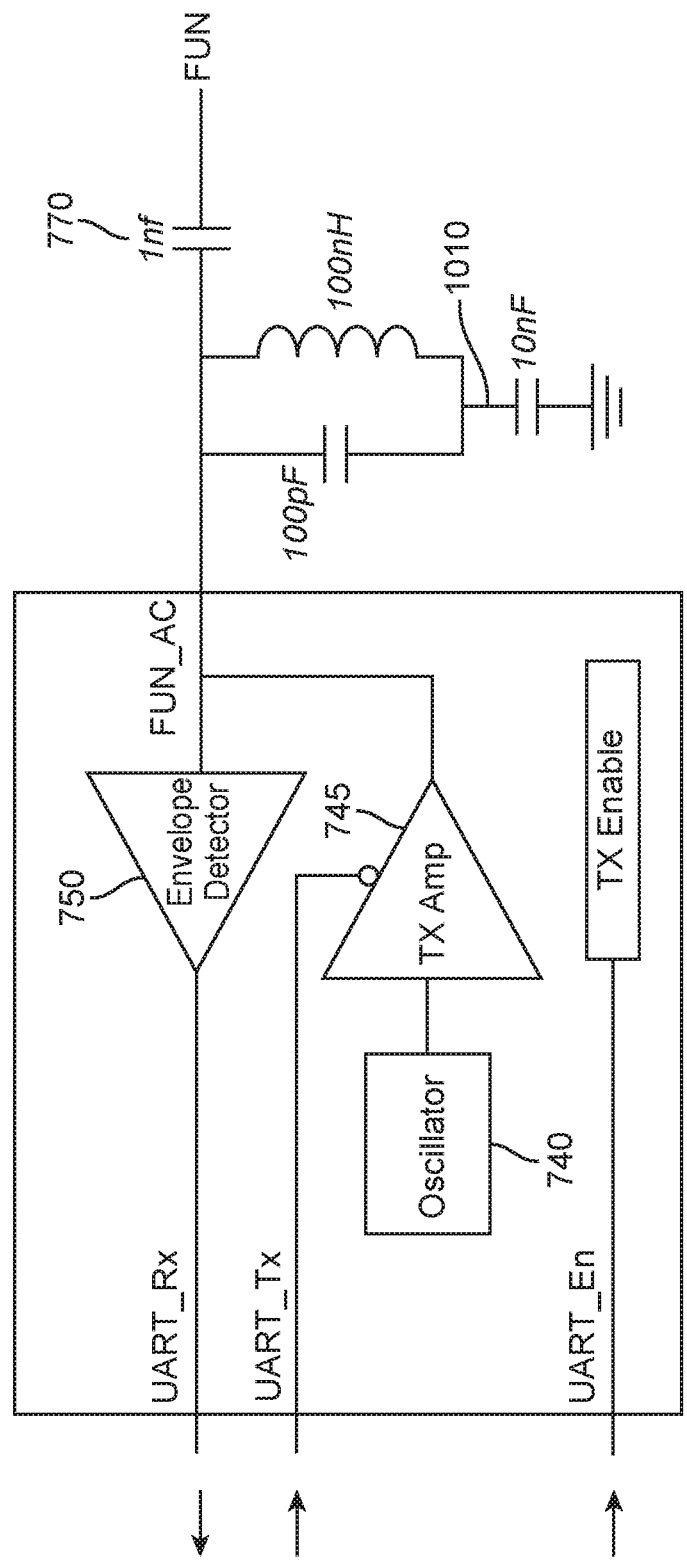
FIG. 10 illustrates a data transceiver for interface circuits in embodiments of the present invention.

FIG. 10 illustrates a data transceiver for the interface circuits 610 and 660 in FIG. 6, and other interface circuits in other embodiments of the present invention. Data transceiver may include a transmitter made up of an oscillator 740 driving a transmit amplifier 745. The frequency of oscillator 740 may be a spread-spectrum modulated signal. Transmit amplifier 745 may be gated on and off to provide data bits having different polarities. The receiver may include envelope detector 750. Envelope detector 750 may optionally drive an interrupt or reset circuit (not shown.) The interrupt or reset circuit may detect the presence of an interrupt signal and may act to reset the interface circuitry. An external resistor (not shown) may optionally be included to adjust the frequency of the oscillator 740. A filter network 1010 may be included to shape the transmitted signal. For example, in one embodiment of the present invention, harmonics and spurious frequencies of the transmitted signal are reduced or removed by this filter. In various embodiment of the present invention, contacts on an accessory and or docking station may be formed such that they may be included as part of this or other filtering network. Multiple filtering networks may be provided to create a notch filter.

Again, the interrupt or reset circuit may receive an output of envelope detector 750. This reset circuit may determine whether the interface and related circuitry should be reset. In various embodiments of the present invention, a docking station may reset one or more accessories using this technique. It should be noted that every transmitted signal is received by receivers at each end of the communication channel. Accordingly, any transmitted interrupt or reset signal is detected by both ends and may reset both the host and accessory sides. In order to avoid a situation where the docking station may reset itself, the docking station might not use its reset circuitry. Example of methods of detecting reset conditions are shown in the following figures.

Figure 11:
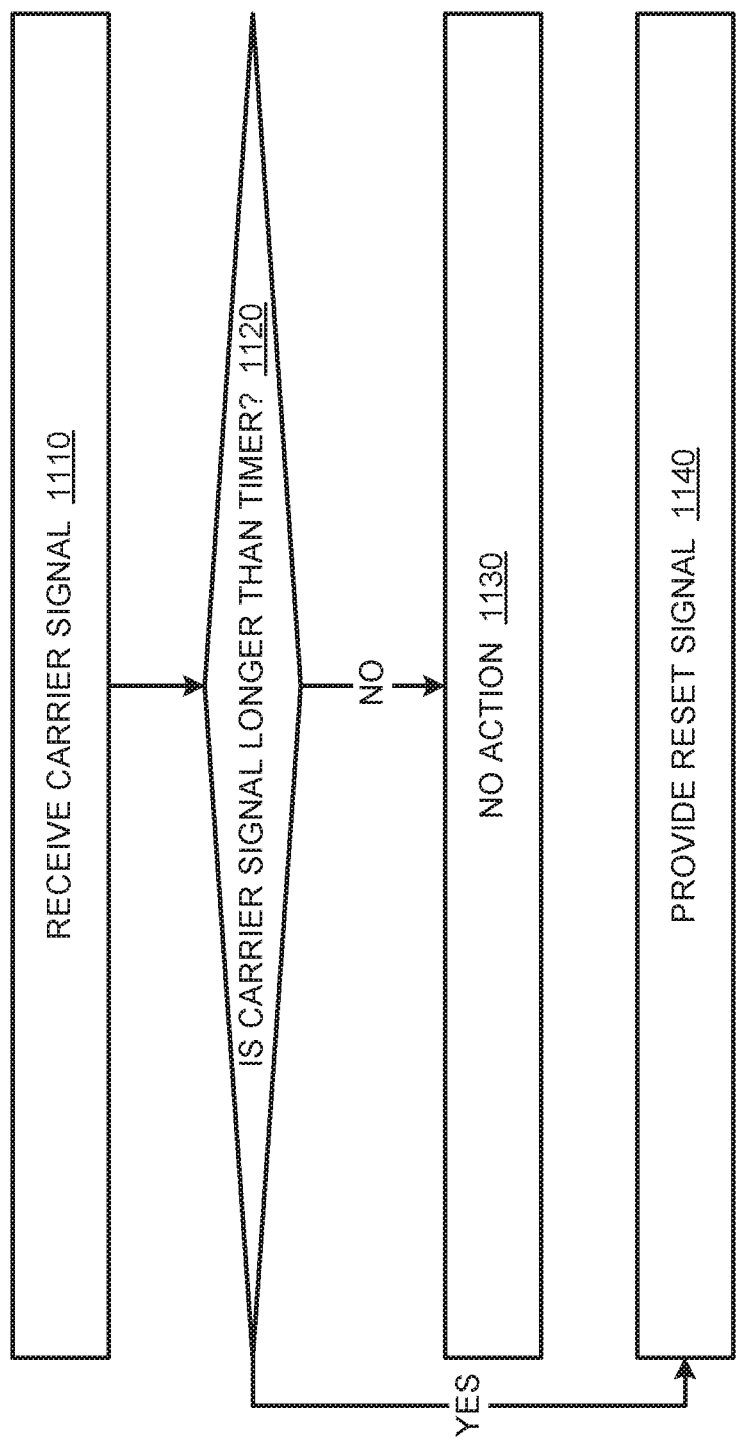
FIG. 11 illustrates an example of detecting a reset condition according to an embodiment of the present invention.

FIG. 11 illustrates an example of detecting a reset condition according to an embodiment of the present invention. In act 1110, a data signal may be received. In act 1120, it may be determined whether the carrier signal is received for a duration longer than a time determined by a timer. For example, an oscillating signal may be sent. It may be determined whether this signal has been received longer than a time indicated by a timer. If it is not, then no action is taken in act 1130. However, if the carrier signal has been received for a period longer than the duration timer, the reset signal may be sent in act 1140.

Figure 12:
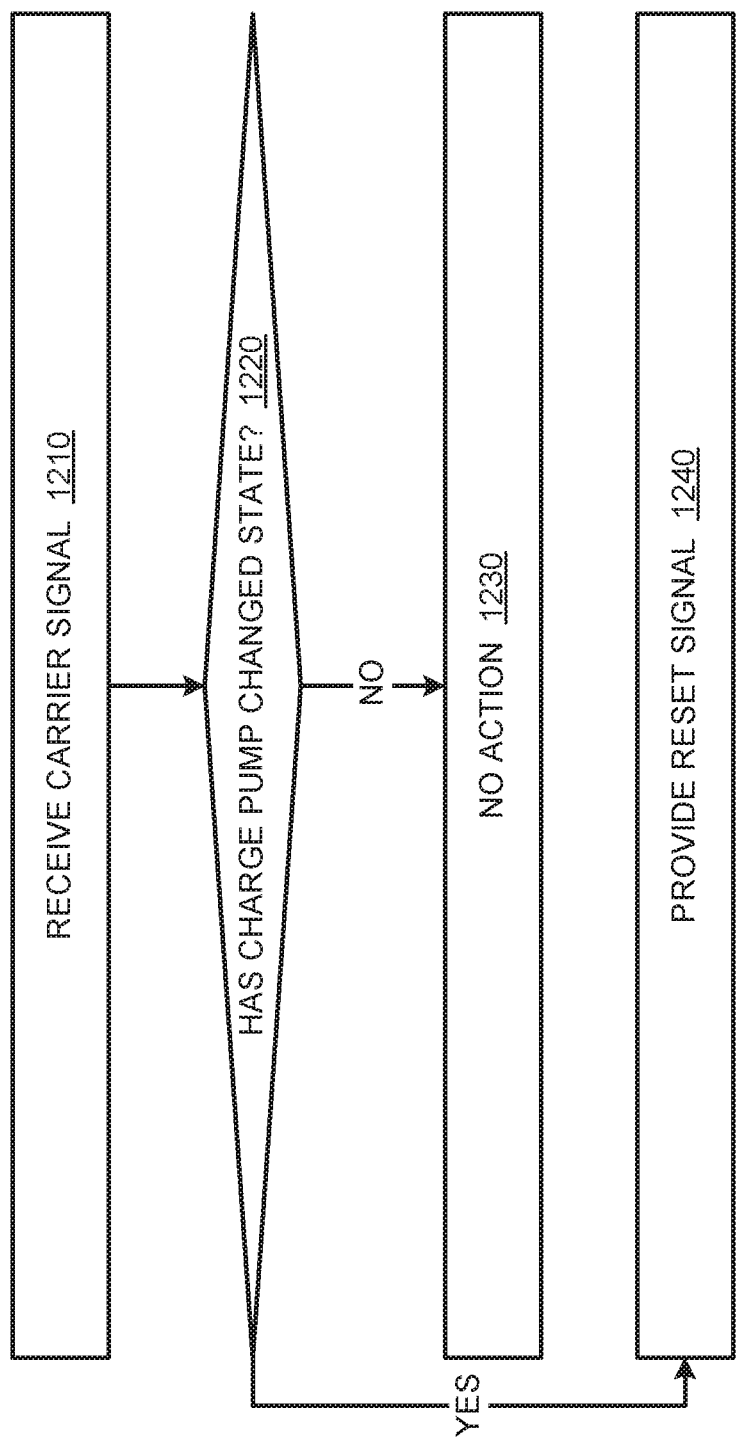
FIG. 12 illustrates another method of detecting a reset condition according to an embodiment of the present invention.

FIG. 12 illustrates another method of detecting a reset condition according to an embodiment of the present invention. In act 1210, a carrier signal may be received. This carrier signal may be of sufficient duration that a charge pump receiving the pulse may change state. If the charge pump does not change state in act 1220, then no action is taken in act 1230. If the carrier signal is long enough to trip a charge pump in act 1220, then a reset signal may be provided in act 1240.

In various embodiments of the present invention, the frequency, amplitude, or other parameter of the transmitted signal may be varied. This variation may be optimized to reduce the bit-error rate of the transmitted signal. An example is shown in the following figure.

Figure 13:
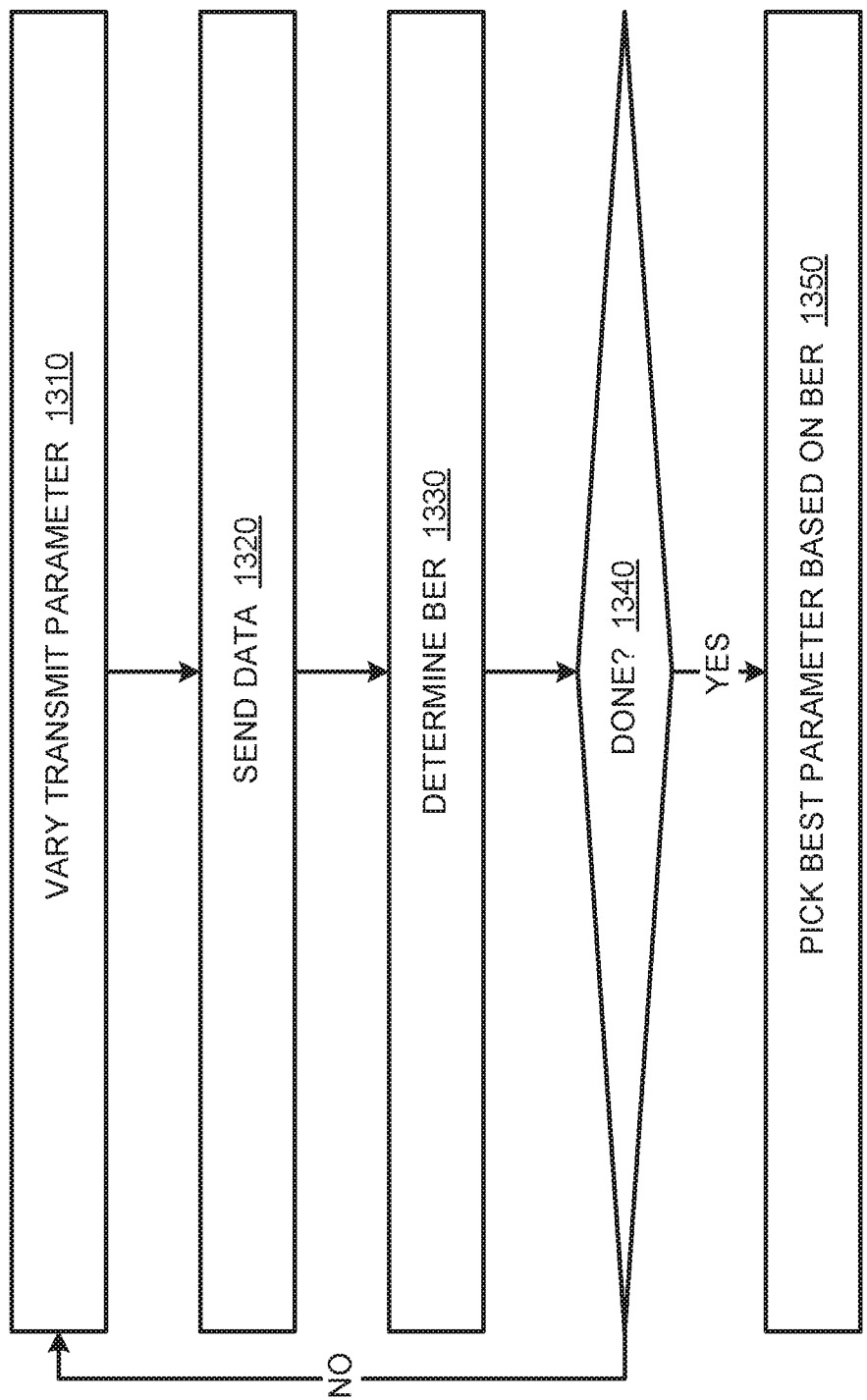
FIG. 13 illustrates a method of varying transmit parameters according to an embodiment of the present invention.

FIG. 13 illustrates a method of varying transmit parameters according to an embodiment of the present invention. In act 1310, a transmit parameter may be varied. Data using that parameter may be sent in act 1320. In act 1330, a bit-error rate of the transmission may be determined. In act 1340, it may be determined whether the transmit parameter has been adjusted over a desired range. If it has not, the various acts may be repeated for a new parameter value. If the transmit parameter has been varied over the desired range, the best value for the parameter, based on bit-error rate, may be chosen in act 1350. This procedure may be used multiple times where various transmit parameters are varied.

These parameters may include carrier amplitude and frequency, transmitter output impedance, data rate, or other parameters.

Figure 14:
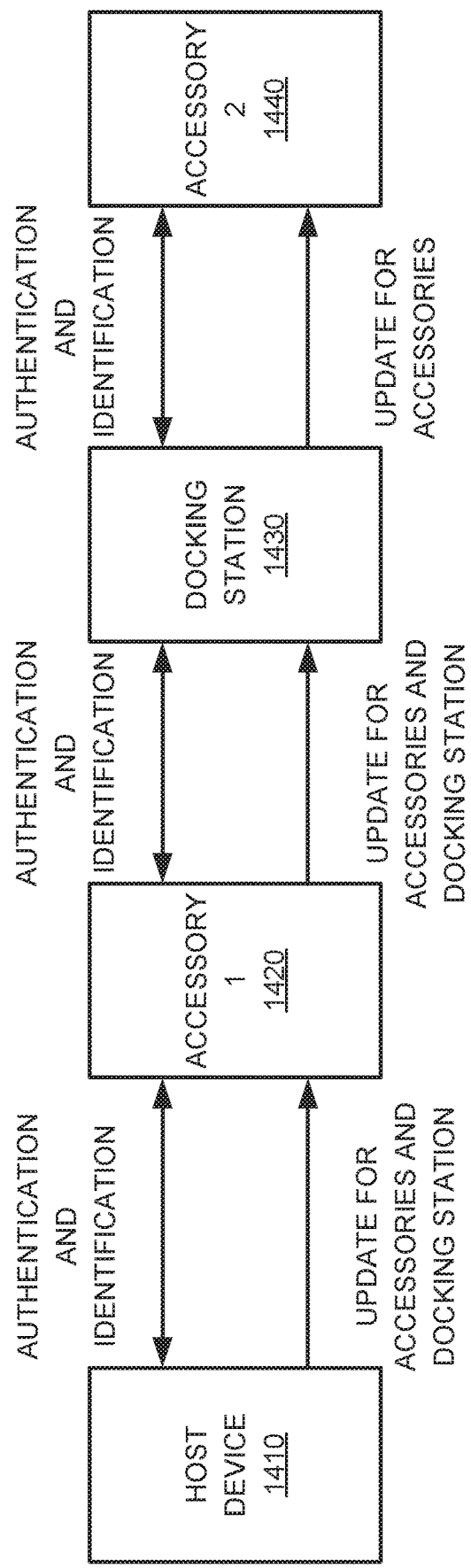
FIG. 14 illustrates a method of authenticating and providing updates for accessories and docking stations according to an embodiment of the present invention.

FIG. 14 illustrates a method of authenticating and providing updates for accessories and docking stations according to an embodiment of the present invention. In this example, the accessories 1420 and 1440 may authenticate the docking station 1430, and the docking station 1430 may authenticate the accessories 1420 and 1440. Each of these devices may also share identification information. This identification information may include software revision information, firmware revision information, and manufacturer identification information, as well as other vendor specific information. At least one of the accessories, in this case accessory 1 1420, may be authenticated by a host computer 1410 over a connection, such as a Bluetooth or USB Type-C connection. The host computer 1410 may be a portable computing device such as a laptop, phone, or tablet, or other computing device. Accessory 1 1420 may provide identification information to the host computer 1410. The host computer 1410 may pass updates to accessory 1 1420. The update information may be software or firmware, or both, and it may be for the docking station 1430 or an accessory 1420 or 1440, or both. Once in the docking stations 1430, accessory 1 1420 may pass updates for the docking station 1430 and accessory 1440 to the docking station 1430 using a two-pin interface as described above. The docking station 1430 may pass accessory updates to the accessory 2 1440 in a similar manner.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of detecting that an accessory is docked in a docking station, the method comprising, with the accessory:
    determining whether a voltage above a threshold is received at a first pin of the accessory, and if a voltage above the threshold is received at the first pin of the accessory, then determining that the accessory is docked in a docking station that is powered by one of an internal battery or external power source, and if a voltage above the threshold is not received by the accessory at the first pin, then;
    providing a voltage at the first pin of the accessory; and
    determining whether an AC voltage waveform is received at the first pin of the accessory, and if the AC voltage waveform is received at the first pin of the accessory, then determining that the accessory is docked in a docking station that is not powered by either the internal battery or external power source, and if the AC voltage waveform is not received at the first pin of the accessory, then determining that the accessory is not docked in a docking station.

2. The method of claim 1 wherein when the accessory determines that the accessory is docked in a docking station, the accessory enters a docked state.

3. The method of claim 2 wherein the docked state is a low-power state.

4. The method of claim 2 wherein a transmitter on the accessory is turned off in the docked state.

5. The method of claim 1 wherein determining whether the AC voltage waveform is received at the first pin of the accessory is done using an envelope detector.

6. The method of claim 1 wherein when the voltage above the threshold is received at a first pin of the accessory, the accessory negotiates with the docking station such that the docking station further continues to provide the voltage at the first pin.

7. The method of claim 6 wherein the accessory provides authentication information to the docking station.

8. The method of claim 7 wherein if the accessory does not provide authentication information to the docking station, the docking station does not continue to provide the voltage at the first pin.

9. A method of detecting that an accessory is docked in a docking station, the method comprising, with the docking station:
    when the docking station is receiving power from either a battery or an external power source:
    providing a current to a first pin of the docking station;
    comparing a resulting voltage on the first pin of the docking station to a threshold voltage after a first duration; and
    if the resulting voltage on the first pin of the docking station is higher than the threshold voltage, then determining that no accessory is docked in the docking station; and
    if the resulting voltage on the first pin of the docking station is not higher than the threshold voltage, then determining that an accessory is docked in the docking station.

10. The method of claim 9 further comprising:
    when the docking station is not receiving power from either a battery or an external power source:
    if the docking station is receiving power at the first pin, then providing a signal waveform at the first pin, otherwise not providing an AC voltage waveform at the first pin.

11. The method of claim 10 wherein the AC voltage waveform is generated by an astable multivibrator.

12. The method of claim 11 wherein the current is provided using a current source.

13. The method of claim 12 wherein comparing a resulting voltage to a threshold voltage after a first duration is done using a comparator.

14. An accessory to mate with a docking station, the accessory comprising:
    a first pin;
    a voltage detect circuit coupled to the first pin and used in determining that the accessory is docked in a docking station that is powered by one of an internal battery or external power source when a voltage received at the first pin is above a threshold;
    a pull-up circuit coupled to the first pin to provide a voltage at the first pin when a voltage received at the first pin is below the threshold; and
    an envelope detector coupled to the first pin and used in determining that the accessory is docked in the docking station that is not powered by one of an internal battery or external power source when an AC voltage waveform is received at the first pin of the accessory and used in determining that the accessory is not docked in the docking station when the AC voltage waveform is not received at the first pin of the accessory.

15. The accessory of claim 14 wherein when the accessory determines that the accessory is docked in a powered docking station, the accessory enters a docked state.

16. The accessory of claim 15 wherein when the accessory determines that the accessory is docked in an unpowered docking station, the accessory enters a docked state.

17. The accessory of claim 16 wherein the docked state is a low-power state.

18. The accessory of claim 17 wherein a transmitter on the accessory is turned off in the docked state.

19. The accessory of claim 14 further comprising a microcontroller,
wherein when the accessory determines that the accessory is docked in a docking station, the microcontroller negotiates with the docking station such that the docking station further continues to provide the voltage at the first pin.

20. The accessory of claim 19 wherein the microcontroller provides authentication information to the docking station.

21. The accessory of claim 20 wherein if the accessory does not provide authentication information to the docking station, the docking station does not continue to provide the voltage at the first pin.

22. A docking station to mate with an accessory, the docking station comprising:
a first pin;
a battery;
a power supply circuit to receive power from either the battery or an external power source;
a current source to provide a current to the first pin for a first duration;
a timer to provide a signal after the first duration; and
a comparator and latch to receive the signal from the timer and to compare a voltage on the first pin of the docking station to a threshold voltage after the first duration in response to receiving the signal from the timer, where the comparator and latch are used in determining that an accessory is not docked in the docking station when the voltage on the first pin is higher than the threshold voltage after the first duration and in determining that an accessory is docked in the docking station when the voltage on the first pin is lower than the threshold voltage after the first duration.

23. The docking station of claim 22 further comprising:
an astable multivibrator to generate a waveform on the first pin when the power supply circuit is not receiving power from either the battery or an external power source and the docking station receives power at the first pin.

24. The docking station of claim 22 further comprising a microcontroller,
wherein when the docking station determines that an accessory is docked in the docking station, the microcontroller negotiates with the accessory such that the docking station further continues to provide the voltage at the first pin.

25. The accessory of claim 24 wherein the microcontroller provides authentication information to the accessory.

26. The method of claim 1 wherein while determining whether a voltage above a threshold is received at a first pin of the accessory, a voltage is not provided at the first pin.

* * * * *